May 22, 1956

R. H. BARNARD 2,747,006

METHOD AND APPARATUS FOR HIGH FREQUENCY
PREPARATION OF MOLTEN GLASS
Filed June 23, 1953

*INVENTOR.*
RANDOLPH H. BARNARD
BY Toulmin & Toulmin
ATTORNEYS

United States Patent Office 2,747,006
Patented May 22, 1956

2,747,006

METHOD AND APPARATUS FOR HIGH FREQUENCY PREPARATION OF MOLTEN GLASS

Randolph H. Barnard, Toledo, Ohio, assignor, by mesne assignments, to L. O. F Glass Fibers Company, Toledo, Ohio, a corporation of Ohio Application June 23, 1953, Serial No. 363,476

14 Claims. (Cl. 13—6)

This invention relates to the heating and melting of glass and more particularly to the production of molten glass of uniform characteristics for drawing into fine filaments.

This application is related to copending application of Everett J. Cook, Serial No. 628,781, filed November 15, 1945, for "Apparatus for Producing Glass Fibers" and assigned to the same assignee as the present invention.

The heating of glass to render it molten for drawing into long filaments has normally been effected in industry by employing long substantially rectangular pots of relatively narrow width which are resistance heated by electricity, the heat of the pot being passed to the glass therein by conduction. The pot is itself made narrow in width in order that the temperature across the body of molten glass will not vary too widely, for temperature control is of critical importance, as temperature directly affects the viscosity and viscosity is a primary factor in filament drawing practice. To facilitate control, the openings of the rectangular pot through which the glass exudes are positioned in straight lines of not more than two rows; uniformity of temperature attained is relatively poor despite these precautions however, due to the manner in which the said rectangular pot is heated, for heating of the glass by conduction alone necessarily introduces some temperature gradient, while the connections to the resistance heated pot introduce hot spots therein.

It is a primary object of this invention to describe a process for the melting of glass which results in an optimum temperature and viscosity condition in the glass.

It is a principal object of this invention to describe a process for the heating of glass in a round pot employing a concentric arrangement of apertures and which process is capable of resulting in substantially a uniform temperature throughout the body of the glass in the pot.

It is an important object of this invention to describe a process in which the glass is itself directly heated by energy applied to the body of the glass.

It is also an object of this invention to describe a process in which the glass body within the pot as well as the pot itself are heated by the applied energy.

It is a further object of this invention to describe a process in which the heating of the glass may take place in two steps.

It is also an object of this invention to describe apparatus useful in the performance of the process of invention.

These and other objects of the invention are attained by employing high frequency heating of the pot and utilizing a glass which when molten is sufficiently conductive to be affected by the field of the high frequency heating coil.

Most suitably the pot is circular in cross section, is surrounded by a circular heating coil and the apertures through which the glass moves when being drawn into strands are circularly arranged in a flat plate in the base of the pot.

The conductivity of the glass and the extent to which it is affected by the field of the high frequency coil is dependent upon the temperature of the glass and the chemical constituents thereof. As the temperature of the glass is raised the electrons achieve more mobility and consequently the electrical resistance of the glass decreases; if the glass contains light weight metals such as the alkalis, the alkaline earths, aluminum, boron, and so forth, the effect of increased temperature on the electrical resistance of the glass is pronounced. For example, the specific resistance may become as low as 100 ohms per centimeter per centimeter squared and while this is still much greater than that of copper it is sufficiently low to make the resistance across a tank of molten glass as small as a few ohms.

For the production of fibers low alkali or substantially alkali-free glasses are preferably employed particularly if the end use of the product is associated with electrical apparatus, and accordingly in such cases the relatively light weight constituents of the glass, such as aluminum or boron, may be relied upon for achieving the required conductivity. In applications where the alkali glass is useful in the drawn filaments the conductivity will be relatively high due to the presence of the sodium or potassium ions.

Since the frequency to which given glasses are responsive may vary it may be desirable in some instances to achieve heating of the pot itself and melting of the glass by conduction at one frequency and then to change over to a higher frequency, for example in the megacycle range, in order to assure of heating of the glass centrally of the pot by the induced current set up by the field of the coil as well as by the conductivity effects from the heated walls.

Alternately, two coils may be employed one operating at a frequency in the range of several hundreds of kilocycles in order to heat the metal pot quickly, while another coil operates in the megacycle range in order to generate in the glass induced currents which result in the heating of the glass.

The chemical constituents of the glass will determine the selection of the frequency in the generation of the induced current in the glass and higher frequencies will be required for the metals such as aluminum, boron and calcium than for the ions of metals such as sodium, potassium and lithium.

The temperature which is required to be attained in the glass in order to achieve suitable viscosity for drawing will also affect the selection of the frequency and the higher the temperature of the glass the lower may be the frequency for effecting the induced currents in the glass.

The invention will be more fully understood by reference to the following detailed description and accompanying drawings wherein.

Figure 1:
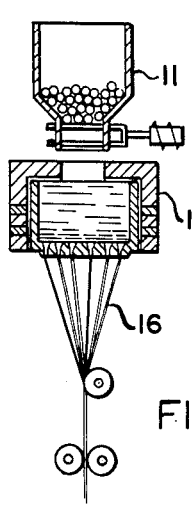
Figure 1 is an elevational view illustrating an arrangement of apparatus for the drawing of filaments in accordance with the precepts of this invention.

Referring to the drawings there is shown in Figure 1 a heating and melting chamber 10 into which glass marbles are fed from a supply hopper 11. These marbles are fed to the chamber 10 at periodic intervals governed by the rate of removal of the glass from the heating and melting chamber.

The marbles are themselves relatively small in diameter, that is about one-half inch, and the chamber 10 is preferably approximately five inches in diameter, and the depth of the molten glass therein will be about two and a half inches and the level of the molten glass in the chamber is maintained at a relatively constant level since the dropping of a single marble in the body is insufficient to cause a noticeable effect on the level of the molten glass.

Figure 2:
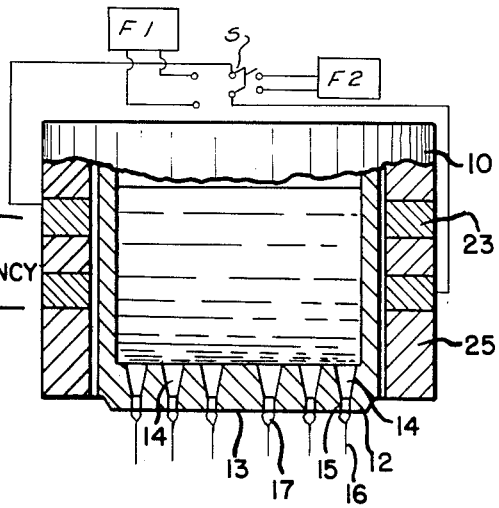
Figure 2 is a sectional view taken on line 2—2 of Figure 1 illustrating the novel heating and melting pot which contains the glass.

The heating and melting chamber 10 is illustrated with greater particularity in Figure 2 wherein it is shown to consist of an inner metal chamber 12 of circular cross section (Figure 3) constructed of platinum to resist the action of molten glasses. The bottom wall 13 of this chamber contains a plurality of openings 14 each having a protrusion or nipple 15 resulting in an aperture in the form of an inverted truncated cone which receives molten glass from the body within the heating crucible 10.

Figure 3:
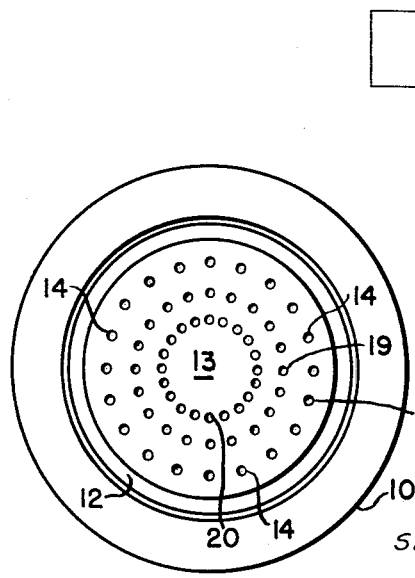
Figure 3 is a bottom view of the structure of Figure 2.

As indicated at 16 the filament is itself formed when drawn from a small globule of molten glass 17 which clings to the aperture 14 at the lower end thereof. Preferably, as illustrated in Figure 3, the bottom wall 13 is in the form of a substantially flat apertured plate in which the tapertures or openings 14 are concentrically arranged, each of the circles 19, 20 and 21 being formed by a plurality of evenly spaced apertures. The spacings between each circular arrangement may be varied as desired and the number of circular arrangements may be suitably chosen to include 50 or 60 apertures or more over the whole plate.

An induction coil 23 is placed around the crucible 10 substantially at the glass melting level of the molten glass in the chamber 12 and the heating chamber is itself surrounded with a ceramic heat insulating material 25 in order that uniform conditions may be maintained within the chamber or pot 12.

The high frequency current may be supplied by any suitable oscillator capable of operation to supply frequency of several hundred kilocycles. Further a high frequency source capable of operation in the megacycle range may also be supplied for the furnishing of current to the coil. Thus as indicated in Figure 2 F1 indicates a source operable to provide a frequency of several hundred kilocycles and F2 indicates a source operable to provide a frequency in the megacycle range; switch S indicated as a double pole double throw may be any suitable switch arrangement for alternately connecting the coil 23 with the sources.

In normal operation a frequency of about 250 kilocycles is supplied to the pot containing the glass and the effect of this energy is to heat first the pot wall itself which thereupon, by the conductive effects, results in melting the glass or maintaining the glass within the chamber 12 molten. The frequency of 250 kilocycles, once the glass has become molten and the electrons thereof somewhat mobile, is sufficient to cause induced currents to occur within the glass body; if the chemical nature of the glass is such that it contains a large amount of alkali, then induced currents cause a heating of the glass and tend to make the temperature and hence the viscosity of the glass within the chamber 12 very uniform.

As the alkali content of the glass employed decreases higher frequency may be required and accordingly a frequency in the megacycle range may be supplied to the glass in addition or alternatively with the frequency in the kilocycle range, the higher frequency being most suitable for the heating of glasses which contain the aluminum, boron and similar atoms.

Figure 4:
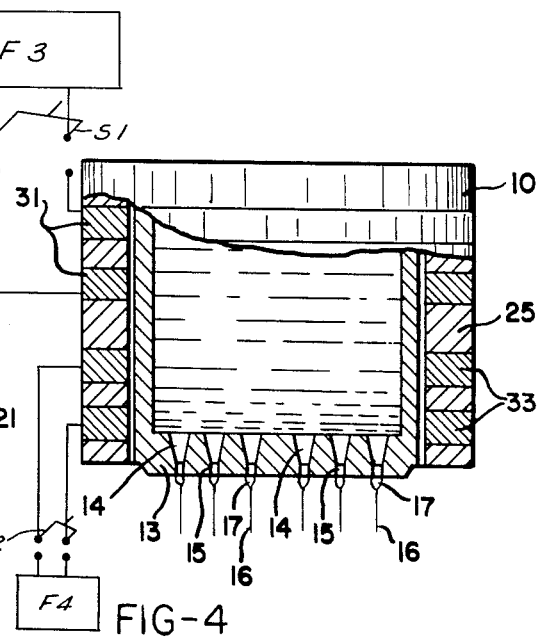
Figure 4 is a sectional view illustrating a further embodiment of a glass pot provided with a pair of heating coils for operation at different frequencies.

As shown in Figure 4 the pot may be surrounded with two coils 31 and 33, one of which receives the energy in the kilocycle range that is 250–300 kilocycles, while the other is supplied with energy in the megacycle range that is, for example, 100 megacycles. Thus as shown in Figure 4 the source F3 may provide 250–300 kilocycles to coil 31 while source F4 provides 100 megacycles to the lower coil 33, switches indicated at S1 and S2 are operable to connect the sources and coils as indicated. Such coils may function together or alternately it being only necessary to insure that in the former case the two coils operate at frequencies for the prevalent conditions which do not result in deleterious actions between the fields. Under the conditions stated the molten glass within the chamber would be extremely uniform for the pot itself, due to the use of the coil, has no hot spots, conductivity from the wall is high, and the energization due to the induced currents within the glass occasions uniformity centrally of the pot or chamber.

The process of invention is particularly useful with glasses which are to be formed into filaments, for such glasses are normally melted around 1800–2000° F. and the specific resistance of the glass in ohms per centimeter per centimeter squared drops rapidly as the temperature increases; thus at about 1300° F. the specific electrical resistance with soda glass is about 100 ohms per centimeter per centimeter squared, while for hard alkali-free glass the specific resistance is somewhat higher and decreases to about 100 ohms per centimeter per centimeter squared at temperatures slightly above 2000° F. Accordingly the resistance across a 5 inch pot will be quite small when the glass is at a high temperature, in fact only a few ohms, and accordingly induced currents may readily flow.

The filaments drawn in accordance with the invention will exhibit extreme uniformity of diameter, and find particular utility in the production of blown fibers, textile yarns and fabrics.

It will be understood that this invention is susceptible to modification in order to adapt it to different usages and conditions and accordingly, it is desired to comprehend such modifications within this invention as may fall within the scope of the appended claims.

I claim:

1. A process for the preparation of molten glass of uniform temperature suitable for drawing into filamentary form comprising inductively heating a body of molten glass at a plurality of frequencies and under conditions of temperature productive of electrical conductivity in the body of glass.

2. A process for the preparation of molten glass of uniform temperature suitable for drawing into filamentary form comprising inductively heating at a first frequency a metal pot containing glass to a temperature of the glass productive of electrical conductivity therein, inductively heating the glass at a second frequency, and continuing the inductive heating to heat the glass uniformly.

3. A process for the preparation of molten glass of uniform temperature suitable for drawing into filamentary form comprising inductively heating a round metal pot containing glass at a first frequency to a temperature of the glass productive of electrical conductivity therein, raising the heating frequency, and then heating the glass inductively at the raised frequency.

4. A process for the preparation of molten glass of uniform temperature suitable for drawing into filamentary form comprising inductively heating at a frequency of several hundreds of kilocycles a round metal pot containing glass having atoms of a light weight metal therein to attain a temperature of the glass productive of electrical conductivity at the frequency, raising the frequency, and continuing the heating to achieve uniformity of temperature in the glass.

5. A process for the preparation of molten glass of uniform temperature suitable for drawing into filamentary form comprising inductively heating at a frequency of several hundreds of kilocycles a round metal pot containing glass having atoms of a light weight metal therein to attain a temperature of the glass productive of electrical conductivity at the frequency, raising the frequency to the megacycle range, and continuing the heating to achieve uniformity of temperature in the glass body.

6. In a process for the inductive heating of glass contained in a round metal pot to a uniform temperature to permit the glass to be drawn into filaments the step of applying a frequency of one value to the assembly to heat the pot inductively and render the glass molten and electrically conductive, and simultaneously applying a frequency of higher value which is proportional to the electrical conductivity of the glass to heat the glass uniformly.

7. In a process for the inductive heating of glass contained in a round metal pot to a uniform temperature to permit the glass to be drawn into filaments the step of applying a frequency of several hundred kilocycles to the assembly, and similarly applying a frequency in the megacycle range to heat the glass uniformly.

8. A process for the preparation of molten glass of uniform temperature suitable for drawing into filamentary form comprising inductively heating a metal pot containing glass having aluminum atoms to a temperature of the glass productive of electrical conductivity therein, raising the frequency, and continuing the inductive heating to heat the glass uniformly.

9. A process for the preparation of molten glass of uniform temperature suitable for drawing into filamentary form comprising inductively heating a metal pot containing glass having alkali metal atoms to a temperature of the glass productive of electrical conductivity therein, raising the frequency, and continuing the inductive heating to heat the glass uniformly.

10. A process for the preparation of molten glass of uniform temperature suitable for drawing into filamentary form comprising inductively heating a metal pot containing glass having boron atoms to a temperature of the glass productive of electrical conductivity therein, raising the frequency, and continuing the inductive heating to heat the glass uniformly.

11. Apparatus for the heating of glass to a uniform temperature condition suitable for the drawing of the glass to filamentary form comprising a round cylindrical pot, a pair of induction coils surrounding the pot, and means to supply different high alternating current frequencies to the coils.

12. Apparatus for the heating of glass to a uniform temperature condition suitable for the drawing of the glass to filamentary form comprising a round cylindrical pot, a pair of induction coils surrounding the pot, means to supply an alternating current of high frequency to one coil and a current of higher frequency to the other coil.

13. Apparatus for the heating of glass to a uniform temperature condition suitable for the drawing of the glass to filamentary form comprising a round cylindrical pot, a coil surrounding the pot, and means to alternately supply a current of a frequency of hundreds of kilocycles and a current of a frequency in the megacycle range to the coil.

14. Apparatus for the heating of glass to a uniform temperature condition suitable for drawing the glass to filamentary form comprising a round cylindrical pot, an induction coil surrounding the pot, and means to alternately supply different high alternating current frequencies to the coil.

References Cited in the file of this patent

UNITED STATES PATENTS

| | | |
|---|---|---|
| 1,853,843 | Bates et al. | Apr. 12, 1932 |
| 2,101,675 | Ferguson | Dec. 7, 1937 |
| 2,181,030 | Thomas | Nov. 21, 1939 |
| 2,186,718 | Ferguson | Jan. 9, 1940 |
| 2,229,489 | Barnard | Jan. 21, 1941 |
| 2,294,266 | Barnard | Aug. 25, 1942 |
| 2,335,135 | Staelin | Nov. 23, 1943 |
| 2,482,299 | Stevens | Sept. 20, 1949 |
| 2,485,851 | Stevens | Oct. 25, 1949 |

FOREIGN PATENTS

| | | |
|---|---|---|
| 608,041 | Great Britain | Sept. 9, 1948 |